United States Patent [19]
Wagner

[11] Patent Number: 5,548,448
[45] Date of Patent: Aug. 20, 1996

[54] WORK-MAGNIFYING FACE SHIELD

[76] Inventor: Otto W. Wagner, 10546 SW. Boones Ferry Rd., Portland, Oreg. 97219

[21] Appl. No.: 325,771

[22] Filed: Oct. 17, 1994

[51] Int. Cl.$^6$ .............................. G02B 27/02; G02B 7/02
[52] U.S. Cl. .................... 359/802; 359/819; 359/810
[58] Field of Search .................................. 359/802, 819,
359/809, 810, 811, 892; 2/202, 205, 206,
15, 427, 6.7, 8, 15, 9

[56] References Cited

U.S. PATENT DOCUMENTS

| | | | |
|---|---|---|---|
| 1,990,369 | 2/1935 | Boyd | 2/8 |
| 2,194,192 | 3/1940 | Auer | 2/14 |
| 3,572,931 | 3/1971 | Adler | 356/46 |
| 3,747,599 | 7/1973 | Malmin | 128/201.12 |
| 3,768,099 | 10/1973 | Manz | 2/8 |
| 3,825,952 | 7/1974 | Pershing | 2/205 |
| 3,865,468 | 2/1975 | Holcomb | 350/146 |
| 4,354,279 | 10/1982 | Walters, Jr. | 2/8 |
| 4,774,723 | 10/1988 | Ruck | 2/8 |
| 5,337,419 | 8/1994 | Russell | 2/9 |

*Primary Examiner*—Georgia Y. Epps
*Assistant Examiner*—Ricky Mack
*Attorney, Agent, or Firm*—Eugene D. Farley

[57] ABSTRACT

A work-magnifying, face shielding helmet assembly consists of a helmet component and a lens component. The latter comprises a frame removably mounted in the helmet recess, opposite the helmet window. A work-magnifying lens is mounted on the frame. A pair of rails grip the lens marginally and releasably. One rail is springable outwardly to permit the lens to gravitate to any desired operating position.

9 Claims, 2 Drawing Sheets

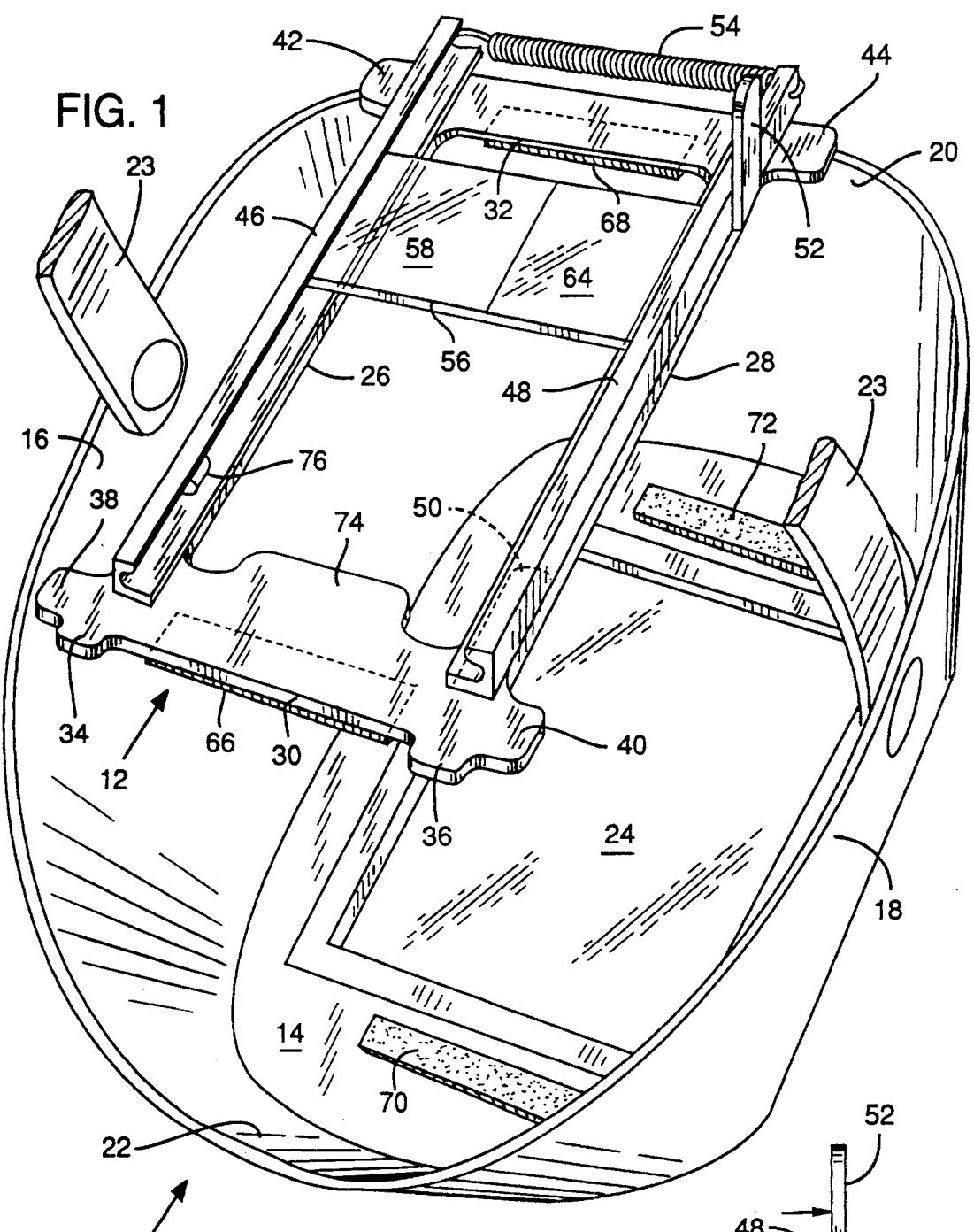
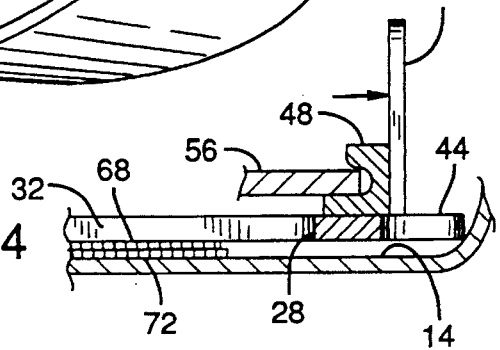

5,548,448

WORK-MAGNIFYING FACE SHIELD

This invention pertains to work-magnifying face shields of the class worn by welders as well as by dentists, medical personnel, and others having need for such an appliance. It pertains particularly to welder's helmets having provision for magnifying the work which is the subject matter of the welding operation, and is described with particular reference to this application, although no limitation thereby is intended.

BACKGROUND AND GENERAL STATEMENT OF THE INVENTION

In welding, it is a matter of primary concern that the welder be able to see the work clearly. This objective often is difficult to achieve, because of the presence of dust and fumes surrounding the work. The problem is augmented by the fact that many welders have defective vision, particularly with advancing age.

Accordingly, the provision of a magnifying lens associated with the window of the welder's helmet is indicated. However, the provision of a suitable lens assembly is difficult because of the confining nature of the helmet, the necessity of from time to time adjusting the position of the lens to suit the position of the work, and the necessity of being able to shift the lens between working and storage positions.

It is the general purpose of the present invention to provide a helmet assembly including a magnifying lens component, which assembly is characterized by several significant functional advantages, as follows:

The magnifying component is easily removable from the helmet, as for cleaning, and just as easily replaced in exactly the proper position.

When the magnifying component is in position within the helmet, its lens by a simple manipulation can be shifted easily to locate it precisely as required by the work location, or to shift it entirely into a storage position. This permits the welder to move about the workplace with normal vision.

The magnifying appliance is adaptable for use with the various standard brands of welder's helmets without modification.

The lenses are easily interchangeable to suit the needs of the welder, and eliminate the need for bifocal eye wear.

It is lightweight, resistant to heat, shiftable by means of a gravity drive, and has no mechanical parts suceptible to dysfunction.

The foregoing and other advantages of the present invention are achieved by the provision of a welder's helmet having front, side, top and bottom walls defining a recess having therein a work-viewing window. In combination with the helmet is a work-magnifying attachment which comprises a frame, frame mounting means removably mounting the frame in the recess opposite the window, and a work-magnifying lens. Provided for the lens is mounting means which mounts the lens on the frame in working position relative to the window of the helmet. Frame positioning means permits centering the frame precisely with respect to the window by a simple manipulation. A further simple manipulation of the mounting for the lens permits gravitational placement of the lens in the optimum position with respect to the work.

THE DRAWINGS

In the drawings:

FIG. 1 is a top perspective view with the magnifying attachment separated from the helmet, illustrating the manner of attaching the accessory to the helmet;

FIG. 4 is a fragmentary sectional view taken along line 4—4 of FIG. 2.

DESCRIPTION OF A PREFERRED EMBODIMENT OF THE INVENTION

Figure 2:
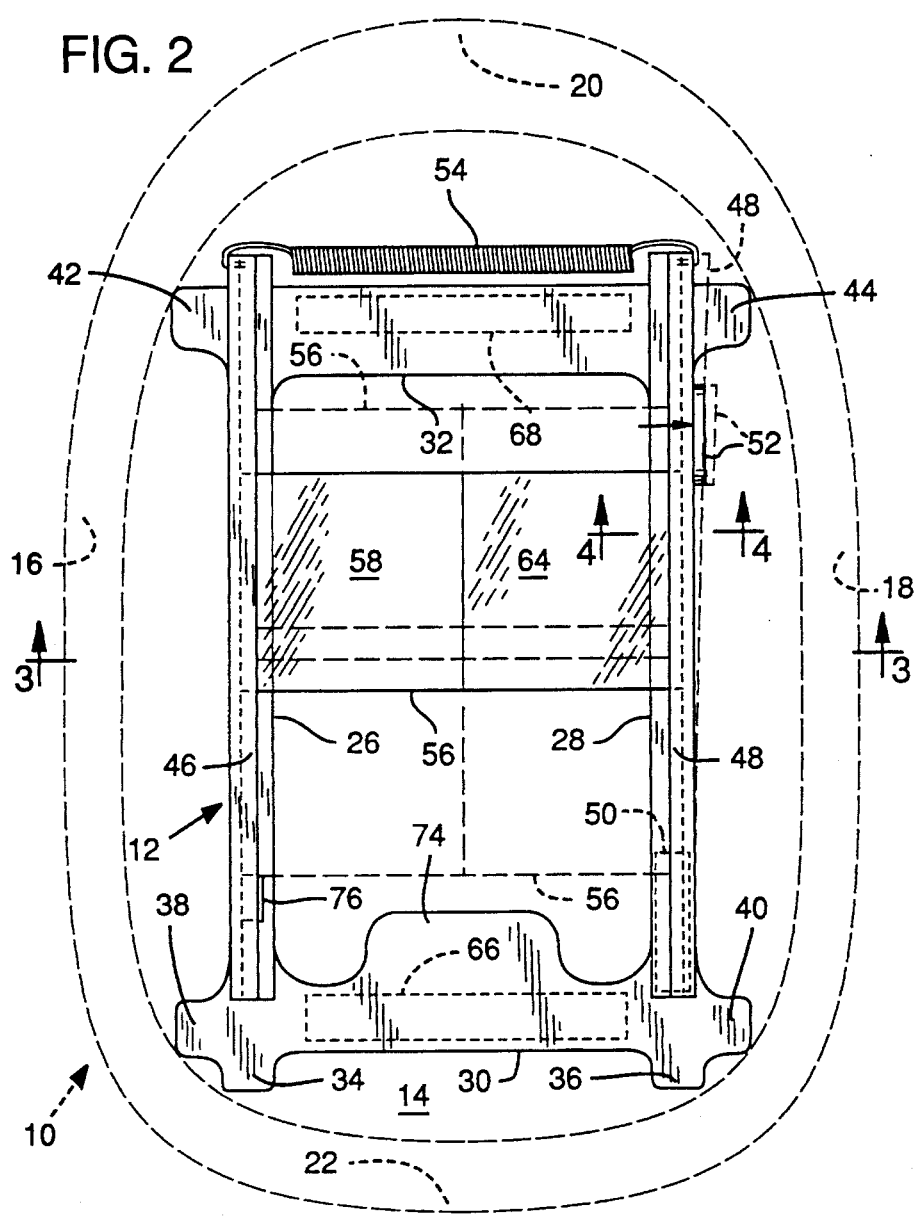
FIG. 2 is a plan view illustrating the magnifying accessory in its working position inside the helmet.
Figure 3:
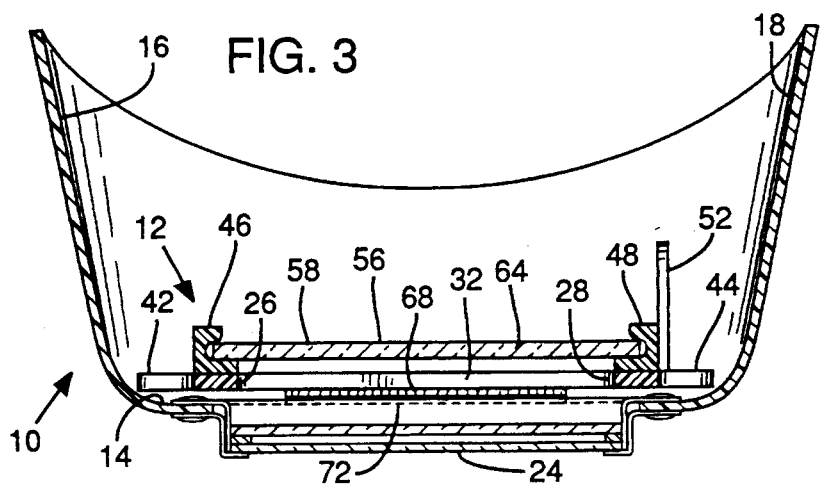
FIG. 3 is a sectional view taken along line 3—3 of FIG. 2.

Referring particularly to FIG. 1, the presently described welding helmet-work-magnifying attachment combination broadly comprises a welder's helmet indicated generally at 10 and a magnifying attachment indicated generally at 12.

As noted above, the helmet component may comprise any one of several commercially available welder's helmets, used without modification. A "big window" helmet such as is illustrated in the drawings is preferred, to make possible maximum work-viewing capability.

In any event, the helmet comprises a front face 14, a left side 16, a right side 18, a top 20 and a bottom 22. A conventional head band 23 also is provided.

Front segment 14 of the helmet includes a window 24, which also is of conventional construction. It normally is of tinted glass as required to screen out the ultraviolet light generated by the welder's torch.

The magnifying attachment 12 is mounted on a frame having a shape and size substantially conforming to the shape and size of helmet front segment 14. It consists of spaced, substantially parallel left and right longitudinal frame members 26, 28; a bottom cross piece 30 and a top cross piece 32. Longitudinal frame-locating fins 34, 36 are formed as integral extensions of longitudinal frame members 26, 28 respectively. Lateral locating fins 38, 40 are formed as integral extensions of bottom frame cross piece 30. The latter two cooperate with lateral locating fins 42, 44, which in effect are lateral extensions of top frame cross piece 32.

It will be seen from FIG. 1 that the locating fins are dimensioned and located at the four corners of the rectangular frame in such a manner that they place the frame, and hence the lens which it mounts, in working position directly opposite window 24. Upon dropping the frame into the helmet recess it is guided automatically by contact with the helmet side walls into its precise working position.

Optical lens-mounting means is mounted on the frame described above.

In the illustrated form of the invention, the lens-mounting means comprises a pair of spaced, substantially parallel grooved rails or tracks 46, 48. Rail 46 is adherently united along its entire length to underlying longitudinal frame member 26. It is held rigidly in place and does not move.

Rail 48, on the other hand, is made of a flexible material, for example resiliently flexible Plexiglass. It is adherently united to underlying longitudinal frame member 28 at its bottom end along only a fraction, for example one third or less, of its length by the application of a suitable adhesive 50. Accordingly, it may be sprung outwardly to its dashed line position of FIG. 2 by means of an attached integral lever 52.

Means are provided for maintaining rail 48 in its normal operating position, aligned with rail 46. As illustrated, such means comprise a coil spring 54 interconnecting the upper ends of the two rails.

A lens 56 is shiftably mounted in the grooves of the two rails. This preferably is a double lens, comprising a left hand segment 58 and a right hand segment 60. It may be a magnification lens, or a prescription lens with segments 58, 60 fitting the prescription.

However, the lens is a single unit, preferably rectangular in outline, dimensioned to span the space between rails 46, 48. It is held frictionally in place in the facing grooves of the two rails as long as the latter remain parallel. However, lens 56 will gravitate downwardly if right-hand rail 48 is sprung outwardly to its dashed line position of FIG. 2, with the helmet in vertical or upwardly inclined position. It may be stopped in any desired position by releasing lever 52. Also, with rail 48 sprung outwardly, the lens may be removed entirely from the unit for cleaning, repair, or replacement with a substitute lens of any desired character.

Lens 56 may be of any desired material, for example clear plastic or glass.

Frame mounting means is provided for mounting the frame assembly including lens 56 in helmet 10, in its working position exactly opposite window 24.

Although various mounting means may be used for this purpose, a preferred mounting means comprises burr-type ("Velcro") mounting means indicated in the drawings by Velcro strips 66, 68 on the underside of the frame and cooperating Velcro strips 70, 72 on the inside of helmet front segment 14.

A pull tab 74 formed integrally with bottom frame member 30 as an inwardly extending segment provides a convenient means for separating the frame subassembly from the helmet when this is desirable or necessary. All that is required is to apply lifting pressure to the pull tab. This separates the lens subassembly from its attaching Velcro and makes possible removing it from the helmet.

A stop 76 limits the downward gravitational movement of the lens and locates the lens in its lower working position.

OPERATION

The manner of operation of the work-magnifying welder's helmet assembly of my invention is as follows:

First, lens 56 is mounted in lens assembly 12. This is accomplished easily by spreading rail 48 apart from rail 46, inserting lens 56 in the grooves of the respective rails, and returning the rails to their parallel position in which they grip the lens. They are maintained in this position by spring 54.

In their FIG. 1 position, the rails engage frictionally the end margins of lens 56, holding the lens in place.

The entire lens assembly then is placed inside the helmet recess in the manner illustrated in FIG. 1. Guided by fins 34–44 inclusive, the lens assembly will come to rest exactly superimposed over helmet window 24 with Velcro strips 66, 70 and 68, 72 in registration with each other. Engagement of the strips mounts the frame in its use position within the helmet.

During use, by actuation of lever 52 the position of lens 56 may be shifted between its FIG. 2 positions as necessary to view the work. This releases lens 56, permitting it to gravitate downwardly to its lower working position. The storage position is all the way to the extreme top of the frame.

Having thus described in detail a preferred embodiment of the present invention, it will be apparent to those skilled in the art that many physical changes may be made in the apparatus without altering the inventive concepts and principles embodied therein. The present embodiment is therefore to be considered in all respects as illustrative and not restrictive, the scope of the invention being indicated by the appended claims.

I claim:

1. A work-magnifying attachment in combination with a face-shielding helmet having front, side, top and bottom walls defining an interior recess having therein a work-viewing window, comprising:

a) a frame, b) frame mounting means for removably mounting the frame in the recess, opposite the work-viewing window, c) work-magnifying lens means for magnifying work and mounting means for mounting the work-magnifying lens means on the frame in working position relative to the window, d) mounting means for mounting the work-magnifying lens means on the frame in working position relative to the window, and e) the mounting means for mounting the work-magnifying lens means comprising a pair of spaced, substantially parallel rails arranged vertically in the working position of the helmet, the lens means being engaged releasably frictionally by the rails, and adjustment means associated with one of the rails for adjusting it in and out of engagement with the lens means, thereby permitting it to adjust between working and storage positions on the frame.

2. The helmet assembly of claim 1 wherein the frame mounting means comprises cooperating Velcro elements on the frame and on the helmet.

3. The helmet assembly of claim 2 including pull tab means on the frame for releasing it from the Velcro frame mounting means.

4. The helmet assembly of claim 1 including frame positioning means for centering the frame with respect to the window.

5. The helmet assembly of claim 4 wherein the frame positioning means comprises a plurality of fins or tabs extending laterally from the frame and serving as guides for contacting the helmet walls as the frame is mounted in the recess.

6. The helmet assembly of claim 1 wherein the mounting means for mounting the work-magnifying lens means includes shifting means for shifting the lens means between working and non working positions.

7. The helmet assembly of claim 1 wherein said one of the rails is resiliently flexible, and including rail anchoring means for anchoring the rail to the frame at its lower end, and lever means attached to the rail for adjusting it between flexed and unflexed positions.

8. The helmet assembly of claim 7 including resilient means interconnecting the two rails at their top ends.

9. The helmet assembly of claim 8 wherein the resilient means comprises a coil spring.

\* \* \* \* \*